US012792594B2

(12) United States Patent
Shi et al.

(10) Patent No.: US 12,792,594 B2
(45) Date of Patent: Nov. 10, 2026

(54) DATA SHARING METHOD AND APPARATUS BASED ON A BLOCKCHAIN

(71) Applicants: Tongfang Knowledge Network Digital Publishing Technology Co., Ltd., Beijing (CN); Tongfang Knowledge Network Technology Co., Ltd. (Beijing), Beijing (CN)

(72) Inventors: Jing Shi, Beijing (CN); Chen Wu, Beijing (CN); Quan Chen, Beijing (CN); Fakui Xie, Beijing (CN); Dejun Xue, Beijing (CN)

(73) Assignees: Tongfang Knowledge Network Digital Publishing Technology Co., Ltd., Beijing (CN); Tongfang Knowledge Network Technology Co., Ltd. (Beijing), Beijing (CN)

( * ) Notice: Subject to any disclaimer, the term of this patent is extended or adjusted under 35 U.S.C. 154(b) by 125 days.

(21) Appl. No.: 18/949,999

(22) Filed: Nov. 16, 2024

(65) Prior Publication Data

US 2026/0093686 A1 Apr. 2, 2026

(30) Foreign Application Priority Data

Sep. 29, 2024 (CN) ......................... 202411367090.8

(51) Int. Cl.
*G06F 16/23* (2019.01)
*H04L 9/00* (2022.01)
(Continued)

(52) U.S. Cl.
CPC ................................ *G06F 16/2379* (2019.01)

(58) Field of Classification Search
CPC ..... G06F 16/2379; Y02D 10/00; H04L 67/10; H04L 9/50; H04L 67/104
See application file for complete search history.

(56) References Cited

U.S. PATENT DOCUMENTS

2020/0034395 A1* 1/2020 Lu ......................... H04L 9/0637
2020/0164886 A1* 5/2020 Dutta ...................... G06F 21/64
(Continued)

FOREIGN PATENT DOCUMENTS

CN 105812912 A 7/2016
CN 107168809 A 9/2017
CN 115604030 A 1/2023

*Primary Examiner* — Charles Rones
*Assistant Examiner* — Mohammad S Bhuyan
(74) *Attorney, Agent, or Firm* — Nitin Kaushik

(57) ABSTRACT

A data sharing method and a data sharing apparatus based on a blockchain are provided, aiming to solve the problem that the existing data sharing cannot meet the sharing requirement of a multi-party collaborative complex scene of combining an industrial blockchain, an Internet of things and an industrial Internet, which relates to the technical field of the blockchain technology. The method includes: creating a multi-chain shared network structure matched with a target service scene, creating shared data and cross-chain link structure of original data, and storing the shared data and cross-chain link structure on the service chain through the cross-chain router; and when the service system sends a query transaction of a target service chain through the cross-chain router, querying a target shared data and cross-chain link structure of the target service chain, and further querying the linked shared data and cross-chain link structure of the linked service chain.

6 Claims, 5 Drawing Sheets

(51) Int. Cl.
*H04L 67/10* (2022.01)
*H04L 67/104* (2022.01)

(56) References Cited

U.S. PATENT DOCUMENTS

| | | | | |
|---|---|---|---|---|
| 2021/0311934 | A1* | 10/2021 | Fang | H04L 9/3247 |
| 2022/0309080 | A1* | 9/2022 | Xiao | G06F 16/288 |
| 2023/0016241 | A1* | 1/2023 | Xiao | G06F 21/602 |
| 2023/0360046 | A1* | 11/2023 | Zhu | G06Q 40/123 |
| 2024/0223390 | A1* | 7/2024 | Wang | G06F 21/60 |
| 2025/0356423 | A1* | 11/2025 | Zhu | G06F 21/64 |

* cited by examiner

DATA SHARING METHOD AND APPARATUS BASED ON A BLOCKCHAIN

CROSS-REFERENCE TO RELATED APPLICATIONS

The application claims priority to Chinese patent application No. 202411367090.8, filed on Sep. 29, 2024, the entire contents of which are incorporated herein by reference.

TECHNICAL FIELD

The present disclosure relates to the field of blockchain technology, and in particular to a data sharing method and a data sharing apparatus based on a blockchain.

BACKGROUND

The blockchain technology is an innovative technology which integrates and applies various computer technologies such as distributed data storage, point-to-point transmission, distributed consensus algorithm, encryption algorithm and the like, and a sharing system constructed based on the blockchain technology needs to realize safe, controllable and trusted shared management of multi-level, multi-target and multi-granularity information. The multi-level information sharing includes three levels of enterprise production management information sharing, industry chain cooperative information sharing and industry and finance cooperative information sharing. Different service chains are constructed by the three levels due to different service targets of shared information. Due to different requirements of service objects, data safety, privacy protection and the like of different service chains, the granularity of information sharing is also different, such as detailed data sharing, abstract data sharing, ciphertext data sharing, statistical data sharing and the like. Therefore, how to construct an easily scalable trusted data sharing model to support the on-demand construction of trusted sharing service chains and break through the system bottleneck of multi-level, multi-target and multi-granularity information trusted sharing is a challenging problem faced by constructing a multi-party collaborative complex scene information sharing system.

Currently, the existing data sharing method based on blockchain information may include storing shared information in single chain mode, master-slave chain mode and multi-chain mode. However, the single-chain model has relatively simple data sharing requirements and is applicable to relatively simple scenes. The master-slave chain model has a large data sharing scale and high requirements for applicable scenes. And multi-chain mode data sharing can only meet the scene of digital asset cross-chain transfer. That is, data sharing in the three modes cannot meet the sharing needs of multi-party collaborative complex scenes of combining an industrial blockchain, an Internet of things and an industrial Internet. The shared data stored in different service chains has severe splitting, so that data sharing cannot be accurately and efficiently backtracked for the multi-party collaborative complex scenes. Therefore, a data sharing method based on a blockchain is urgently needed to solve the above technical problems.

SUMMARY

In view of this, a data sharing method and a data sharing apparatus based on a blockchain are provided according to the present disclosure, aiming to solve the problem that the existing data sharing cannot meet the sharing requirement of a multi-party collaborative complex scene of combining an industrial blockchain, an Internet of things and an industrial Internet.

According to an aspect of the present disclosure, a data sharing method based on a blockchain is provided. The method includes:

creating a multi-chain shared network structure matched with a target service scene, wherein the multi-chain shared network structure includes a service chain, a service system and a cross-chain router;

creating shared data and cross-chain link structure of original data after the service system collects the original data, and storing the shared data and cross-chain link structure on the service chain through the cross-chain router;

when the service system sends a query transaction of a target service chain through the cross-chain router, querying a target shared data and cross-chain link structure of the target service chain, and further querying the linked shared data and cross-chain link structure of the linked service chain based on the target shared data and cross-chain link structure.

Further, the shared data and cross-chain link structure includes a shared data item identifier, shared data item information fields, and cross-chain link fields of the shared data item, and wherein the creating shared data and cross-chain link structure of original data includes:

constructing the shared data item identifier based on a chain identifier of the original data and a data item in-chain identifier, wherein the shared data item identifier is used for uniquely identifying the shared data item;

extracting a shared information field of the shared data item based on the target service scene, and constructing the shared data item information fields based on the shared information field, wherein the shared data item information fields are used for describing the shared information of the target service scene; and determining a cross-chain relationship based on the shared data item information fields and constructing cross-chain link fields of the shared data item using both the cross-chain relationship and the linked shared data item identifier.

Further, the creating shared data and cross-chain link structure of original data includes:

when the shared data item information fields include data information of a data block or off-chain storage information of a data file/data block, configuring the cross-chain link fields of the shared data item as null link;

when the shared data item information fields include data hash value information of a data file/data block, configuring the cross-chain link fields of the shared data item as feature link;

when the shared data item information fields include service key shared information, configuring the cross-chain link fields of the shared data item as containing link; and when the shared data item information fields include service shared derivative information, configuring the cross-chain link fields of the shared data item as derivative link.

Further, the creating a multi-chain shared network structure matched with a target service scene includes:

creating a service chain matched with the target service scene and a service system for data storage operation and query operation of the service chain based on an alliance chain technology; and establishing communication between the service chain and the cross-chain router based on a cross-chain technology, wherein different cross-chain routers are connected with each other, and the service system is communicated with the cross-chain router.

Further, the storing the shared data and cross-chain link structure data on the service chain through the cross-chain router includes:

initiating an initiation operation of the cross-chain transaction for storing the shared data on the service chains through the service system via the communication with the cross-chain router, and determining the service chains and the shared data and cross-chain link structures used for storing the shared data through the cross-chain router;

initiating a transaction operation of storing the shared data and cross-chain link structure on the service chain through the service system via the cross-chain router, and monitoring the shared data storage transaction state of the service chain;

when all transaction operations of storing the shared data and cross-chain link structure on the service chain are completed, initiating a submitting operation of the cross-chain transaction, and submitting the data changes of all shared data and cross-chain link structure to the corresponding service chains; and when not all transaction operations are completed, initiating a rollback operation of the cross-chain transaction, and revoking the data changes of all shared data and cross-chain link structures from the corresponding service chains.

Further, the querying a target shared data and cross-chain link structure of the target service chain, and querying the linked shared data and cross-chain link structure of the linked service chain based on the target shared data and cross-chain link structure includes:

querying the target shared data and cross-chain link structure of the target service chain based on a target shared data item identifier through the service system via the cross-chain router; and analyzing the cross-chain link fields of the target shared data and cross-chain link structure through the service system, and performing query operation on the linked shared data based on the cross-chain link fields of the target shared data item to obtain the linked shared data and cross-chain link structure of the linked service chain.

Further, the performing query operation on the linked shared data based on the cross-chain link fields of the target shared data item includes:

when the cross-chain link field of the target shared data item is null link, ending the query operation on the linked shared data; and when the cross-chain link field of the target shared data item is any one of the following: the feature link, the containing link and the derivative link, querying the linked shared data and cross-chain link structure of the linked service chain linked with the target shared data item through the service system via the cross-chain router.

According to another aspect of the present disclosure, a data sharing apparatus based on a blockchain is provided. The apparatus includes:

a first creation module configured to create a multi-chain shared network structure matched with a target service scene, wherein the multi-chain shared network structure includes a service chain, a service system and a cross-chain router;

a second creation module configured to create shared data and cross-chain link structure of original data after the service system collects the original data, and store the shared data and cross-chain link structure on the service chain through the cross-chain router; and a querying module configured to, when the service system sends a query transaction of a target service chain through the cross-chain router, query a target shared data and cross-chain link structure of the target service chain, and further query the linked shared data and cross-chain link structure of the linked service chain based on the target shared data and cross-chain link structure.

Further, the shared data and cross-chain link structure includes shared data item identifier, shared data item information fields, and cross-chain link fields of the shared data item. The second creation module includes:

a first constructing unit configured to construct the shared data item identifier based on a chain identifier of the original data and a data item in-chain identifier, wherein the shared data item identifier is used for uniquely identifying the shared data item;

an extracting unit configured to extract a shared information field of the shared data item based on the target service scene, and construct the shared data item information fields based on the shared information field, wherein the shared data item information fields are used for describing the shared information of the target service scene; and a determining unit configured to determine a cross-chain relationship based on the shared data item information fields and construct cross-chain link fields of the shared data item using both the cross-chain relationship and the linked shared data item identifier.

Further, the apparatus further includes:

a configuration module configured to, when the shared data item information fields include data information of a data block or off-chain storage information of a data file/data block, configure the cross-chain link fields of the shared data item as null link; when the shared data item information fields include data hash value information of a data file/data block, configure the cross-chain link fields of the shared data item as feature link; when the shared data item information fields include service key shared information, configure the cross-chain link fields of the shared data item as containing link; and when the shared data item information fields include service shared derivative information, configure the cross-chain link fields of the shared data item as derivative link.

Further, the first creation module is configured to: create a service chain matched with the target service scene and a service system for data storage operation and query operation of the service chain based on an alliance chain technology; and establish communication between the service chain and the cross-chain router based on a cross-chain technology, wherein different cross-chain routers are connected with each other, and the service system is communicated with the cross-chain router.

Further, the second creation module is further configured to: initiate an initiation operation of a cross-chain transaction for storing the shared data on the service chains through the service system via the communication with the cross-chain router, and determine the service chains and the shared data and cross-chain link structures used for storing the shared data through the cross-chain router; initiate a transaction operation of storing the shared data and cross-chain link structure on the service chain through the service system via the cross-chain router, and monitor the shared data storage transaction state of the service chain; when all transaction operations of storing the shared data and cross-chain link structure on the service chain are completed, initiate a submitting operation of the cross-chain transaction, and submit the data changes of all shared data and cross-chain link structures to the corresponding service chains; and when not all data transaction operations are completed, initiate a rollback operation of the cross-chain transaction, and revoke the data changes of all shared data and cross-chain link structures from the corresponding service chains.

Further, the querying module includes:

a first querying unit configured to query the target shared data and cross-chain link structure of the target service chain based on a target shared data item identifier through the service system via the cross-chain router; and a second querying unit configured to analyze the cross-chain link fields of the target shared data item through the service system, and perform query operation on linked shared data based on the cross-chain link fields of the target shared data item to obtain the linked shared data and cross-chain link structure of the linked service chain.

Further, the second querying unit is specifically configured to: when the cross-chain link field of the target shared data item is null link, end the query operation on the linked shared data; and when the cross-chain link field of the target shared data item is any one of the following: the feature link, the containing link and the derivative link, query the linked shared data and cross-chain link structure of the linked service chain linked with the target shared data item through the service system via the cross-chain router.

A storage medium is provided according to yet another aspect of the present disclosure, wherein at least one executable instruction is stored in the storage medium, and the executable instruction causes a processor to perform operations corresponding to the above data sharing method based on a blockchain.

According to yet another aspect of the present disclosure, a terminal is provided. The terminal includes: a processor, a memory, a communications interface and a communication bus through which the processor, the memory and the communications interface communicating with each other.

The memory is configured to store at least one executable instruction, and the executable instruction causes the processor to perform the operations corresponding to the data sharing method based on a blockchain.

By means of the above technical solutions, the embodiments provided by the present disclosure have at least the following advantages.

A data sharing method and a data sharing apparatus based on a blockchain are provided according to the present disclosure. In the embodiments of the present disclosure, in comparison with the prior art, a multi-chain shared network structure matched with a target service scene is created, wherein the multi-chain shared network structure includes a service chain, a service system and a cross-chain router. Shared data and cross-chain link structure of original data is created after the service system collects the original data, and the data storage operation of the service chain is performed on the shared data and cross-chain link structure through the cross-chain router. When the service system sends a querying transaction of a target service chain through the cross-chain router, a target shared data and cross-chain link structure of the target service chain is queried, and further the linked shared data and cross-chain link structure of the linked service chain is queried based on the target shared data and cross-chain link structure. Which effectively supports the trusted storage and trusted query of the cross-chain shared data based on a multi-link shared network. The trusted sharing and efficient tracing of multi-level, multi-target and multi-granularity information under a multi-party collaborative complex scene are realized, and the effectiveness of data sharing based on a blockchain is improved. Therefore, it provides the technical support for constructing an information sharing system of the multi-party collaborative complex scene.

The descriptions hereinabove are merely brief descriptions of the technical solutions of the present disclosure. Specific embodiments of the present disclosure are described hereinafter, so that technical means of the present disclosure can be more clearly understood and can be implemented according to the content of the specification, and purposes, characteristics and advantages of the present disclosure can be more apparent and understandable.

BRIEF DESCRIPTION OF THE DRAWINGS

By reading the detailed description of preferred embodiments below, various other advantages and benefits are clear to those skilled in the art. The drawings are used only for showing the preferred embodiments and are not intended to limit the present disclosure. Moreover, throughout the accompanying drawings, same reference numerals represent identical components. In the accompanying drawings.

DETAILED DESCRIPTION OF THE EMBODIMENTS

Figure 1:
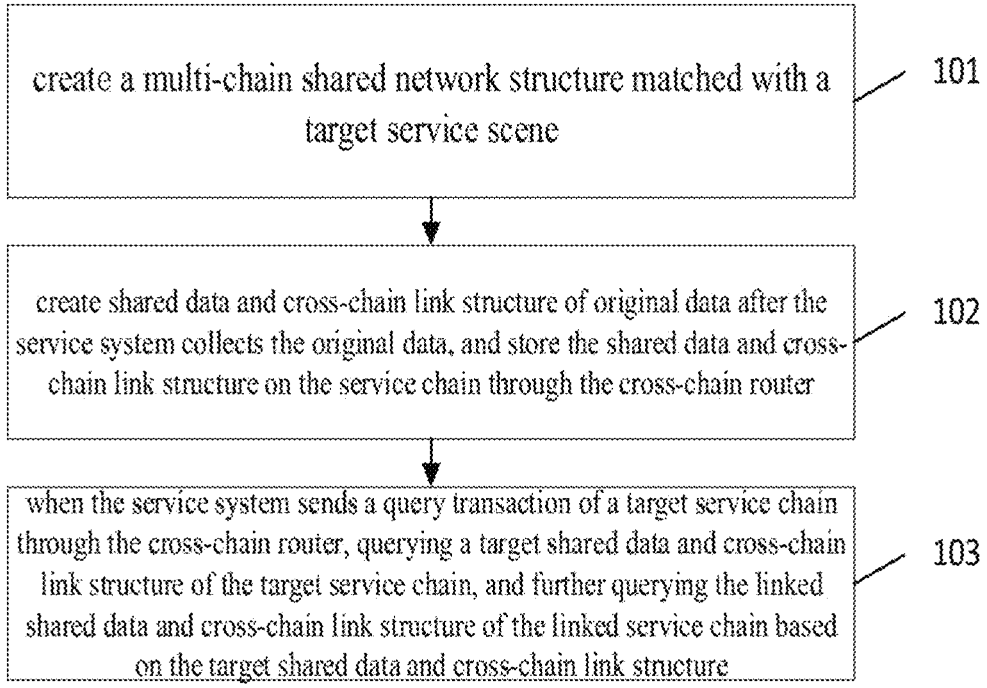
FIG. 1 shows a flowchart of a data sharing method based on a blockchain according to an embodiment of the present disclosure.

Hereinafter, exemplary embodiments of the present application will be described in detail with reference to the drawings. Although exemplary embodiments of the present disclosure are shown in the drawings, it should be understood that the present disclosure may be implemented in various manners and is not limited to the specific embodiments described below. Instead, these embodiments are provided to make a more thorough understanding of the present disclosure and to fully convey the scope of the present disclosure to those skilled in the art.

A data sharing method based on a blockchain is provided according to an embodiment of the present disclosure. As shown in FIG. 1, the method includes steps 101 to 103.

In 101, a multi-chain shared network structure matched with the target service scene is created.

In the embodiment of the present disclosure, the target service scene is a complex scene needing multi-party cooperative data sharing. Different service scenes need different data sharing contents. Therefore, the current execution terminal firstly creates a multi-chain shared network structure matched with the target service scene. The multi-chain shared network structure includes a service chain, a service system and a cross-chain router. The service chain is uniquely identified by a chain identifier (BCid) and matched with the target service scene. The service chain is an alliance chain constructed on the basis of meeting the common data security and privacy protection requirements of relevant parties of shared data. The service chain supports the trusted storage and the trusted query of the shared data and link structure. At this time, the service chain may be, but is not limited to, constructed on the basis of blockchain technologies such as Hyperledger Fabric, FISCO BCOS and the like, which is not specifically limited in the embodiment of the present disclosure. The service system is an application system used for completing the data storage and cross-chain query service of cross-chain shared data of multiple service chains, which is not specifically limited in the embodiment of the present disclosure. The cross-chain router is a service module connecting both the service system and the service chain. The cross-chain router is connected with the service chain, may be simultaneously communicated with multiple service chains, and provides a uniform service chain calling interface for the service system. The cross-chain router supports functions of service chain dynamic access, cross-chain transaction processing and the like, and realizes multi-chain network dynamic expansion and shared data atomicity transactional cross-chain operation. At this time, the cross-chain router may be, but is not limited to, constructed on the basis of FISCO BCOS cross-chain collaboration platform WeCross technology, which is not specifically limited in the embodiment of the present disclosure.

In 102, shared data and cross-chain link structure of original data is created after the service system collects the original data, and further the shared data and cross-chain link structure is stored on the service chain through the cross-chain router.

In the embodiment of the present disclosure, after the multi-chain shared network structure is constructed, in order to implement data sharing, firstly, shared data content needs to be stored on the service chain. That is, the service system first collects original data, where the original data is shared data content that needs to be stored on the service chain. The collected original data are different for different target service scenes, which is not specifically limited in the embodiment of the present disclosure. Furthermore, a shared data and cross-chain link structure of the original data is created, that is, defined according to the data sharing requirement as a data structure. The shared data and cross-chain link structure includes three types of data, namely, shared data item identifier (SDid), shared data item information fields (DataFields) and cross-chain link fields of the shared data item (LinkFields), so that the service system performs the original data storage on the service chain through the cross-chain router according to the data structure of the shared data item identifier (SDid), the shared data item information fields (DataFields) and the cross-chain link fields of the shared data item (LinkFields), and obtains the shared data of each service chain.

In 103, when the service system sends a query transaction of a target service chain through the cross-chain router, a target shared data and cross-chain link structure of the target service chain is queried, and then the linked shared data and cross-chain link structure of the linked service chain is queried based on the target shared data and cross-chain link structure.

In the embodiment of the present disclosure, after the shared data is stored on the service chain, the user with sharing qualifications may query the shared data through the service system. At this time, the user with sharing qualifications may be an information sharing party in the multi-party collaboration for constructing the multi-chain shared network structure, which is not specifically limited in the embodiment of the present disclosure. After the user sends a query transaction of the target service chain through the cross-chain router using the service system, a current execution terminal queries a target shared data and cross-chain link structure of the target service chain, and then queries linked shared data and cross-chain link structure of the corresponding linked service chain based on the target shared data and cross-chain link structure, so that both the target shared data and the linked shared data are retrieved.

It should be noted that, the current execution body is used as an execution terminal for constructing, storing, and querying the cross-chain shared data, and may be a cross-chain server or a cross-chain service system, which is not specifically limited in the embodiment of the present disclosure.

In another embodiment of the present disclosure, in order to further describe the present disclosure, the step of creating shared data and cross-chain link structure of original data includes:

- constructing the shared data item identifier based on a chain identifier of the original data and a data item in-chain identifier;
- extracting a shared information field of the shared data item based on the target service scene, and constructing the shared data item information fields based on the shared information field; and
- determining a cross-chain relationship based on the shared data item information fields and constructing cross-chain link fields of the shared data item using both the cross-chain relationship and the linked shared data item identifier.

In order to effectively describing the shared data and improving the storage and query effectiveness of the shared data, the shared data and cross-chain link structure are constructed, which is composed of three types of data, namely, shared data item identifier (SDid), shared data item information fields (DataFields) and cross-chain link fields of the shared data item (LinkFields). The shared data item identifier (SDid) is used for uniquely identifying a shared data item, and is constructed based on a chain identifier (BCid) of the original data collected by the service system and a data item in-chain identifier UUID. The shared data item identifier is represented as Bcid/UUID to serve as a unique identification code for data storage, sharing and tracing. The shared data item information fields (DataFields) is used for representing the content of the shared data, which is composed of one or more extracted shared information fields of the target service scene, and used to record KV value of the selected shared information fields, including but not limited to data hash value information, data storage information, service shared information, and the like. Meanwhile, the service shared information records multi-party shared information related to the service, which may include but not limited to participant information, entity description information, process record information, state record information, and derivative record information, which is not specifically limited in the embodiment of the present disclosure. In order to reflect the relationship among the shared data, a cross-chain relationship is determined based on the shared data item information fields to represent whether the shared data is linked. Further, cross-chain link fields of the shared data item are constructed based on the cross-chain relationship and the linked data item identifier. That is, the cross-chain link fields of the shared data item record one or more cross-chain shared data items linked with the current shared data item, which are expressed as <cross-chain shared data item identifier SDid, link relationship>. The link relationship may be, but not limited to, [data file/data block: data hash value] feature link, [detail data: extracted data] containing link, and [original data: derived data] derivative link. The derived data may be, but not limited to, encrypted data, statistical analysis data, AI generated data, and the like, which is not specifically limited in the embodiment of the present disclosure.

In a specific implementation scene, after the service system collects original data, shared data and cross-chain link structures (ShareStu-1, . . . , ShareStu-N) of N service chains (Chain-1, . . . , Chain-N) related to original data are respectively constructed for a multi-chain network structure. The shared data and cross-chain link structure is a data structure stored on the service chain, and describes the shared content of the original data on the service chain. Specifically, the shared data item to be written in the shared data and link structure and the corresponding shared data content are determined by the service requirement, and the user may write in the shared data and link structure though the service system, which is not specifically limited in the embodiment of the present disclosure. Specifically, the construction process includes the following steps: 1) collecting chain identifier (BCid) and data item in-chain identifier UUID of N service chains respectively and generating shared data item identifier (SDid), wherein the generation method may be in the form of, but not limited to, Bcid/UUID, Bcid. UUID, etc., which is not specifically limited in the embodiment of the present disclosure; 2) collecting and recording KV value of one or more fields of the shared information of shared data item information fields (DataFields) of N service chains respectively, wherein the shared information may be, but is not limited to, data hash value information, off-chain data storage information, and participant information, process record information, state record information, derivative generation information, and the like, which is not specifically limited in the embodiment of the present disclosure; 3) recording one or more linked field information of cross-chain link fields (Linkfields) of the shared data items of the N service chains respectively, in the form of <cross-chain shared data item identifier SDid, link relationship). The above collecting method may vary depending on the data source. The service system may read data from a database, a data file, or an acquisition device, or may read data from a client in a manual entry manner, which is not specifically limited in the embodiment of the present disclosure.

In another embodiment of the present disclosure, in order to further describe the present disclosure, the step of creating shared data and cross-chain link structure of original data includes:

when the shared data item information fields include data information of a data block or off-chain storage information of a data file/data block, configuring the cross-chain link fields of the shared data item as null link;

when the shared data item information fields include data hash value information of a data file/data block, configuring the cross-chain link field of the shared data item as feature link;

when the shared data item information fields include service key shared information, configuring the cross-chain link fields of the shared data item as containing link; and when the shared data item information fields include service shared derivative information, configuring the cross-chain link fields of the shared data item as derivative link.

In order to realize trusted verification of shared data among multiple chains and effectively support the trusted data lineage analysis among multiple chains, so that solve the problems of data source tracing, troubleshooting and influence range analysis, so when shared data and cross-chain link structure are created, firstly need to analyze data content in the shared data item information fields (DataFields) to determine whether corresponding link relationship exists in the shared data among all service chains. In a specific implementation scene, when the shared data item information fields include data information or storage information (e.g., data information of a data block or off-chain store information of a data file/data block), it indicates that there is no link relationship between current shared data item and other across-chain shared data items. Thus, it is only necessary to configure the cross-chain link fields of the shared data item as null link. The cross-chain link fields of the shared data item (LinkFields) are expressed as <NULL, NULL>. When the shared data item information fields include hash value information (e.g., data hash value information of a data file/data block), a cross-chain shared data item identifier SDid may be collected whose information stored in the shared data item information fields (DataFields) contains the data block information or an off-chain storage information of a data file/data block corresponding to the data hash value. The cross-chain link fields of the shared data item are configured as feature link. At this time, the cross-chain link fields of the shared data item (LinkFields) are expressed as <cross-chain shared data item identifier SDid, feature link>. When the shared data item information fields include service key shared information (which may include but is not limited to information such as service-related parties, service process records, service state records, and the like), a cross-chain shared data item identifier SDid is collected whose information stored in the shared data item information fields (DataFields) is detail information of the service key shared information. The cross-chain link fields of the shared data item are configured as containing link. The cross-chain link fields of the shared data item (LinkFields) are expressed as <cross-chain shared data item identifier SDid, containing link>. When the shared data item information fields include service shared derivative information (which may include, but is not limited to, encryption data, statistical analysis data, AI generated data, and other information), a cross-chain shared data item identifier SDid is collected whose information stored in the shared data item information fields (DataFields) is original data of the service shared derivative information. The cross-chain link fields of the shared data item are configured as derivative link. The cross-chain link fields of the shared data item (LinkFields) are expressed as <cross-chain shared data item identifier SDid, derivative link>.

Figure 2:
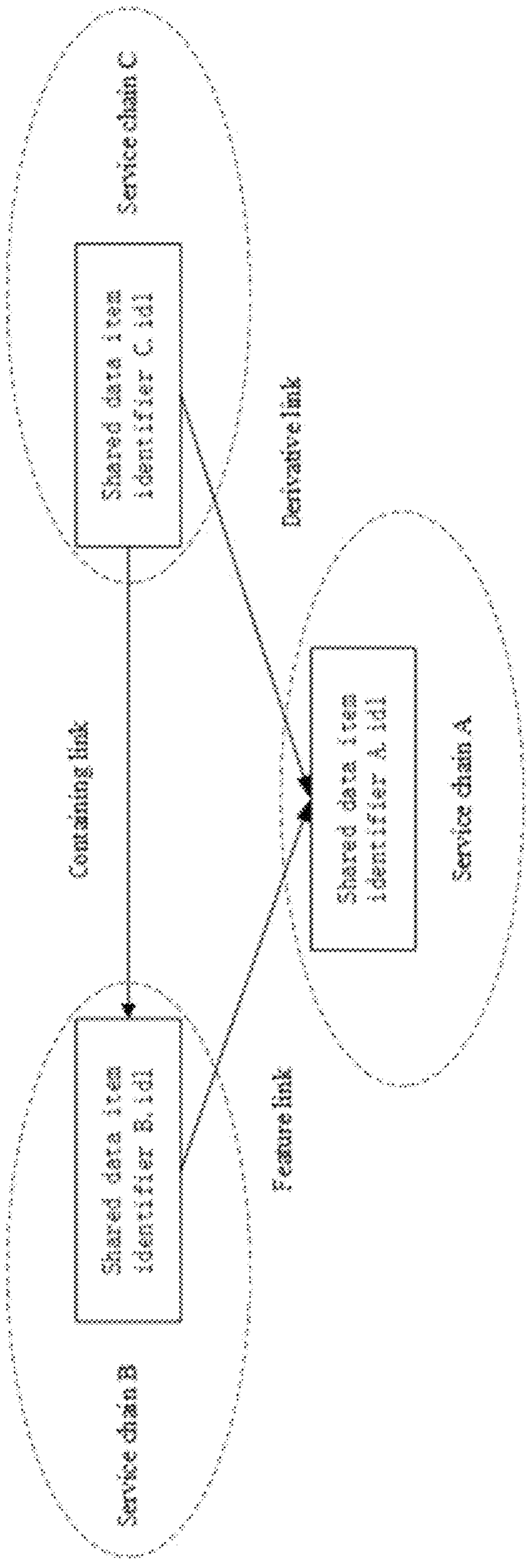
FIG. 2 shows a schematic diagram illustrating a cross-chain link structure of a multi-service-chain shared data item according to an embodiment of the present disclosure.

In a specific implementation scene, as shown in FIG. 2, a shared data item cross-chain link example of the multi-chain shared network is shown. Specifically, the shared data item identified as B.id1 in the service chain B has a "feature link" relationship with the shared data item identified as A.id1 in the service chain A. That is, a hash value of a data block/data file in the service chain A is stored in the service chain B. The shared data item identified as C.id1 in the service chain C has a "containing link" relationship with the shared data item identified as B.id1 in the service chain B, and has a "derivative link" relationship with the shared data item identified as A.id1 in the service chain A. That is, a part of shared data in the service chain C is directly copied from the service chain B, and another part of shared data is generated by algorithm calculation based on the data in the service chain A.

In another embodiment of the present disclosure, in order to further describe the present disclosure, the step of creating a multi-chain shared network structure matched with a target service scene includes:

creating a service chain matched with the target service scene and a service system for data storage operation and query operation of the service chain based on an alliance chain technology; and establishing communication between the service chain and the cross-chain router based on a cross-chain technology.

In order to ensure the atomicity effect of data storage operation of N service chains by using cross-chain transaction processing, when a multi-chain shared network structure is constructed, a service chain matched with the target service scene is firstly established based on an alliance chain technology, and a service system is developed for supporting data storage operation and query operation of the service chain. Further, communication between the service chain and the cross-chain router is established based on a cross-chain technology. Different cross-chain routers are connected with each other, and the service system is communicated with the cross-chain router.

Figure 3:
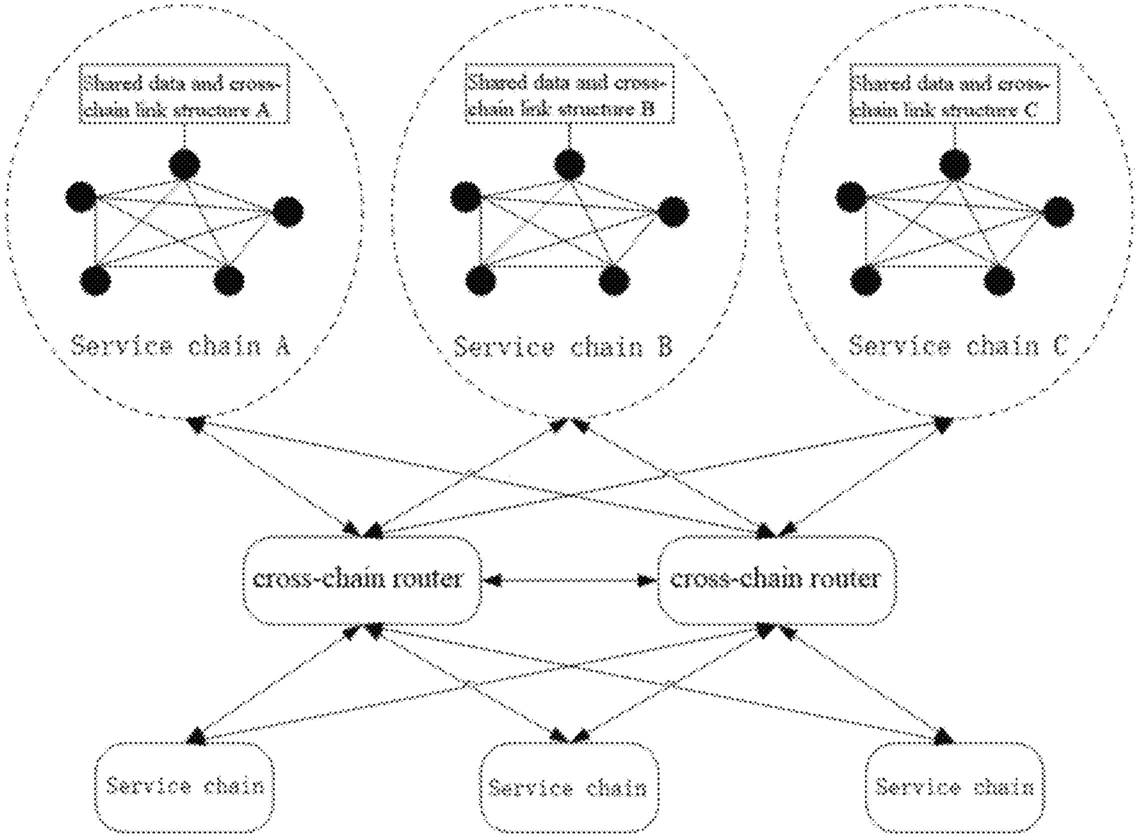
FIG. 3 shows a schematic structural diagram of a multi-chain shared network structure according to an embodiment of the present disclosure.

It should be noted that, the multi-chain shared network structure constructed according to the embodiment of the present disclosure may include at least one service chain, at least one cross-chain router and at least one service system. Multiple service chains may be constructed simultaneously or at any time according to a data sharing requirement, which is not specifically limited in the embodiment of the present disclosure. In addition, different cross-chain routers may be connected with each other by, but not limited to, using P2P protocol to support forwarding requests to each other and synchronize the adaptation information of the multi-chain shared network. At this time, multiple service systems correspond to different shared data services to satisfy the service requirements of different terminal users. For example, as shown in FIG. 3, the multi-chain shared network structure includes a service chain A, a service chain B, and a service chain C, which store shared data and cross-chain link structure A, shared data and cross-chain link structure B, and shared data and cross-chain link structure C, respectively. It also includes two cross-chain routers, which are interconnected and connected to the three service chains respectively. The three service systems may access all service chains through any cross-chain route, support different shared data services, and serve different end users.

In another embodiment of the present disclosure, in order to further describe the present disclosure, the step of storing the shared data and cross-chain link structure data on the service chain through the cross-chain router includes:

initiating an initiation operation of a cross-chain transaction for storing the shared data on the service chains through the service system via the communication with the cross-chain router, and determining the service chains and the shared data and cross-chain link structures used for storing the shared data through the cross-chain router;

initiating a transaction operation of storing the shared data and cross-chain link structure on the service chain through the service system via the cross-chain router, and monitoring the shared data storage transaction state of the service chain;

when all transaction operations of storing the shared data and cross-chain link structure on the service chains are completed, initiating a submitting operation of the cross-chain transaction, and submitting the data changes of all shared data and cross-chain link structures to the corresponding service chains; and when not all transaction operations are completed, initiating a rollback operation of the cross-chain transaction, and revoking the data changes of all shared data and cross-chain link structures from the corresponding service chains.

In order to effectively realize the purpose of data sharing based on blockchain, firstly, an initiation operation of a cross-chain transaction for storing the shared data on the service chains is initiated through the service system via the communication with the cross-chain router, and both the service chain and the shared data and cross-chain link structure used for storing the shared data are determined through the cross-chain router. Furthermore, a transaction operation of storing the shared data and cross-chain link structure on the service chain is initiated to the service chain through the service system via the cross-chain router, and the shared data storage transaction state of the service chain is monitored. For example, the service system initiates an initiation operation of a cross-chain transaction for storing the shared data on the service chain. At the same time, the cross-chain router locks the shared data and link structures (ShareStu-1, . . . , ShareStu-N) corresponding to N service chains (Chain-1, . . . , Chain-N). Further, the service system initiates the transaction operations of storing shared data and link structures (ShareStu-1, . . . , ShareStu-N) on the N service chains (Chain-1, . . . , Chain-N) through the cross-chain router respectively. The service system monitors the transaction states of the shared data and link structures (ShareStu-1, . . . , ShareStu-N) corresponding to the N service chains (Chain-1, . . . , Chain-N) through the cross-chain router. In a specific implementation scene, when all transaction operations are completed, a submitting operation of the cross-chain transaction is initiated, and the data change of the shared data and cross-chain link structure corresponding to the service chain is submitted. That is, when all data storage transaction operations of N service chains (Chain-1, . . . , Chain-N) are completed, the service system initiates the submitting operation of the cross-chain transaction through the cross-chain router, and successfully confirms all data changes of data storage operations of the shared data and link structure (ShareStu-1, . . . , ShareStu-N) corresponding to the N service chains (Chain-1, . . . , Chain-N). When not all data storage transaction operations are completed, a rollback operation of the cross-chain transaction is initiated, and the data change of the shared data and cross-Chain link structure corresponding to the service chain is revoked. That is, when a certain step of the data storage transaction of the N service chains (Chain-1, . . . , Chain-N) fails to be executed, the service system initiates the rollback operation of the cross-chain transaction through the cross-chain router, and successfully revokes the data changes of all data storage transaction of the shared data and link structure (ShareStu-1, . . . , ShareStu-N) corresponding to the N service chains (Chain-1, . . . , Chain-N).

In another embodiment of the present disclosure, in order to further describe the present disclosure, the step of querying a target shared data and cross-chain link structure corresponding to the target service chain, and querying the linked shared data and cross-chain link structure of the linked service chain based on the target shared data and cross-chain link structure includes:

querying the target shared data and cross-chain link structure of the target service chain based on a target shared data item identifier through the service system via the cross-chain router; and analyzing the cross-chain link fields of the target shared data item corresponding to the target shared data item identifier through the service system, and performing query operation on cross-chain shared data based on the cross-chain link fields of the target shared data item to obtain the linked shared data and cross-chain link structure of the linked service chain.

In order to effectively achieve the purpose of querying shared data, when target shared data is queried, firstly, the service system sends a query transaction of the shared data and cross-chain link structure ShareStu-x of a target service Chain Chain-x with the shared data item identifier SDid-x through the cross-chain router, and collects a query result ShareStu-x (SDid-x). Since the shared data and cross-chain link structure includes the cross-chain link fields of the target shared data item, the cross-chain link fields of the target shared data item corresponding to the target shared data item identifier are analyzed through the service system, and query operation is performed on cross-chain shared data based on the cross-chain link fields of the target shared data item to obtain the linked shared data and cross-chain link structure of the linked service chain as the query result. For example, the ShareStu-x (SDid-x) is analyzed through the service system. All the information of <cross-chain shared data item identifier SDid-x-x, link relationship> of the cross-chain link fields of the shared data item is obtained, and query operation is performed on the cross-chain shared data according to the information of <cross-chain shared data item identifier SDid-x-x, link relationship>, which is not specifically limited in the embodiment of the present disclosure.

In another embodiment of the present disclosure, in order to further describe the present disclosure, the step of performing query operation on cross-chain shared data based on the cross-chain link fields of the target shared data item includes:

when the cross-chain link field of the target shared data item is null link, ending the query operation on the linked cross-chain shared data; and when the cross-chain link field of the target shared data item is any one of the following: the feature link, the containing link and the derivative link, querying the linked shared data and cross-chain link structure of the linked service chain linked with the target shared data item through the service system via the cross-chain router.

In order to effectively query shared data in other service chains to achieve the purpose of data sharing in multiple complex scenes, when query operation is performed on the cross-chain shared data based on the cross-chain link fields of the target shared data item, the cross-chain link fields of the target shared data item are determined first. When the cross-chain link field of the target shared data item is null link, it is indicated that no linked shared data exists, and therefore, the query operation of the cross-chain shared data is finished. When the cross-chain link field of the target shared data item is any one of the following: the feature link, the containing link and the derivative link, it is indicated that the linked shared data exists, so that the service system queries linked shared data and cross-chain link structure of the linked service chain linked with the target shared data and cross-chain link structure corresponding to the target shared data item identifier through the cross-chain router as a query result. For example, the method flow for performing query operation of the cross-chain shared data includes the following steps: 1) when the cross-chain link fields of the shared data item (Linkfields) is <NULL, NULL>, which indicates that the cross-chain shared data does not exist, the cross-chain querying process is ended; 2) when the cross-chain link fields of the shared data item (Linkfields) include information of <cross-chain shared data item identifier SDid-x-x, feature link/containing link/derivative link>, submitting a querying transaction of the shared data and cross-chain link structure ShareStu-x-x with the cross-chain shared data item identifier SDid-x-x) through the service system via the cross-chain router, and collecting a query result ShareStu-x-x(SDid-x-x); and 3) continuously querying and analyzing the cross-chain link fields of the shared data item (Linkfields) of ShareStu-x-x (SDid-x-x), until the cross-chain link field of the shared data item (Linkfields) is <NULL, NULL>, and the cross-chain querying process is finished; otherwise, continuously performing the steps 2) and 3).

A data sharing method based on a blockchain is provided according to the present disclosure. In the embodiments of the present disclosure, in comparison with the prior art, a multi-chain shared network structure matched with a target service scene is created, wherein the multi-chain shared network structure includes a service chain, a service system and a cross-chain router. Shared data and cross-chain link structure of original data is created after the service system collects the original data, and data storage operation of the service chain is performed on the shared data and cross-chain link structure through the cross-chain router. When the service system sends a querying transaction of a target service chain through the cross-chain router, a target shared data and cross-chain link structure corresponding to the target service chain is queried, and further the linked shared data and cross-chain link structure of the linked service chain is queried based on the target shared data and cross-chain link structure. Which effectively supports the trusted storage and trusted query of the cross-chain shared data based on a multi-link shared network. The trusted sharing and efficient tracing of multi-level, multi-target and multi-granularity information under a multi-party collaborative complex scene are realized, and the effectiveness of data sharing based on a blockchain is improved. Therefore, it provides the technical support for constructing an information sharing system of the multi-party collaborative complex scene.

Figure 4:
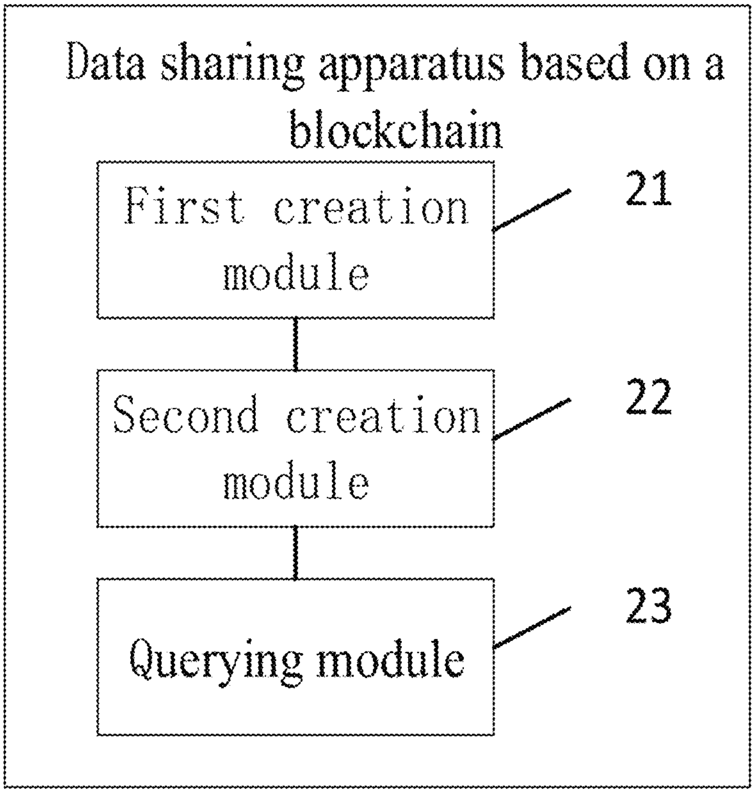
FIG. 4 shows a block diagram illustrating a data sharing apparatus based on a blockchain according to an embodiment of the present disclosure.

Further, as an implementation of the method shown in FIG. 1, a data sharing apparatus based on a blockchain is provided according to an embodiment of the present disclosure. As shown in FIG. 4, the apparatus includes a first creation module 21, a second creation module 22 and a querying module 23.

The first creation module 21 is configured to create a multi-chain shared network structure matched with a target service scene, wherein the multi-chain shared network structure includes a service chain, a service system and a cross-chain router.

The second creation module 22 is configured to create shared data and cross-chain link structure of original data after the service system collects the original data, and perform data storage operation of the service chain on the shared data and cross-chain link structure through the cross-chain router.

The querying module 23 is configured to, when the service system sends a querying transaction of a target service chain through the cross-chain router, firstly query a target shared data and cross-chain link structure corresponding to the target service chain, and then query the linked shared data and cross-chain link structure of the linked service chain based on the target shared data and cross-chain link structure.

Further, the shared data and cross-chain link structure includes shared data item identifier, shared data item information fields, and cross-chain link fields of the shared data item. The second creation module includes:

a first constructing unit configured to construct the shared data item identifier based on a chain identifier of the original data and a data item in-chain identifier, wherein the shared data item identifier is used for uniquely identifying the shared data item;

an extracting unit configured to extract a shared information field of the shared data item based on the target service scene, and construct the shared data item information fields based on the shared information field, wherein the shared data item information fields are used for characterizing content of the shared data; and a determining unit configured to determine a cross-chain relationship based on the shared data item information fields and construct cross-chain link fields of the shared data item using both the cross-chain relationship and the linked shared data item identifier.

Further, the apparatus further includes:

a configuration module configured to, when the shared data item information fields include data information of a data block or off-chain storage information of a data file/data block, configure the cross-chain link fields of the shared data item as null link; when the shared data item information fields include data hash value information of a data file/data block, configure the cross-chain link fields of the shared data item as feature link; when the shared data item information fields include service key shared information, configure the cross-chain link fields of the shared data item as containing link; and when the shared data item information fields include service shared derivative information, configure the cross-chain link fields of the shared data item as derivative link.

Further, the first creation module is configured to: create a service chain matched with the target service scene and a service system for data storage operation and query operation based on an alliance chain technology; and establish communication between the service chain and the cross-chain router based on a cross-chain technology, wherein different cross-chain routers are connected with each other, and the service system is communicated with the cross-chain router.

Further, the second creation module is further configured to: initiate an initiation operation of a cross-chain transaction for the data storage on the service chains through the service system via the communication with the cross-chain router, and determine the service chains and the shared data and cross-chain link structures used for storing the shared data through the cross-chain router; initiate a transaction operation of storing the shared data and cross-chain link structure on the service chain through the service system via the cross-chain router, and monitor the shared data storage transaction states of the service chain; when all data storage transaction operations on the service chain are completed, initiate a submitting operation of the cross-chain transaction, and submit the data changes of all shared data and cross-chain link structure to the corresponding service chains; and when not all data storage transaction operations on the service chain are completed, initiate a rollback operation of the cross-chain transaction, and revoke the data changes of all shared data and cross-chain link structure from the corresponding service chains.

Further, the querying module includes:

a first querying unit configured to query the target shared data and cross-chain link structure of the target service chain based on a target shared data item identifier through the service system via the cross-chain router; and a second querying unit configured to analyze the cross-chain link fields of the target shared data item corresponding to the target shared data item identifier through the service system, and perform query operation on linked shared data based on the cross-chain link fields of the target shared data item to obtain the linked shared data and cross-chain link structure of the linked service chain.

Further, the second querying unit is specifically configured to: when the cross-chain link field of the target shared data item is null link, end the query operation on the linked shared data; and when the cross-chain link field of the target shared data item is any one of the following: the feature link, the containing link and the derivative link, query the linked shared data and cross-chain link structure of the linked service chain linked with the target shared data item through the service system via the cross-chain router.

A data sharing apparatus based on a blockchain is provided according to the present disclosure. In the embodiments of the present disclosure, in comparison with the prior art, a multi-chain shared network structure matched with a target service scene is created, wherein the multi-chain shared network structure includes a service chain, a service system and a cross-chain router. Shared data and cross-chain link structure of original data is created after the service system collects the original data, and the data storage operation of the service chain is performed on the shared data and cross-chain link structure through the cross-chain router. When the service system sends a querying transaction of a target service chain through the cross-chain router, a target shared data and cross-chain link structure of the target service chain is queried, and further the linked shared data and cross-chain link structure of the linked service chain is queried based on the target shared data and cross-chain link structure. Which effectively supports the trusted storage and trusted query of the cross-chain shared data based on a multi-link shared network. The trusted sharing and efficient tracing of multi-level, multi-target and multi-granularity information under a multi-party collaborative complex scene are realized, and the effectiveness of data sharing based on a blockchain is improved. Therefore, it provides the technical support for constructing an information sharing system of the multi-party collaborative complex scene.

A storage medium is provided according to an embodiment of the present disclosure, wherein at least one executable instruction is stored in the storage medium. The computer executable instruction may be used for performing the method according to any one of the above method embodiments.

Figure 5:
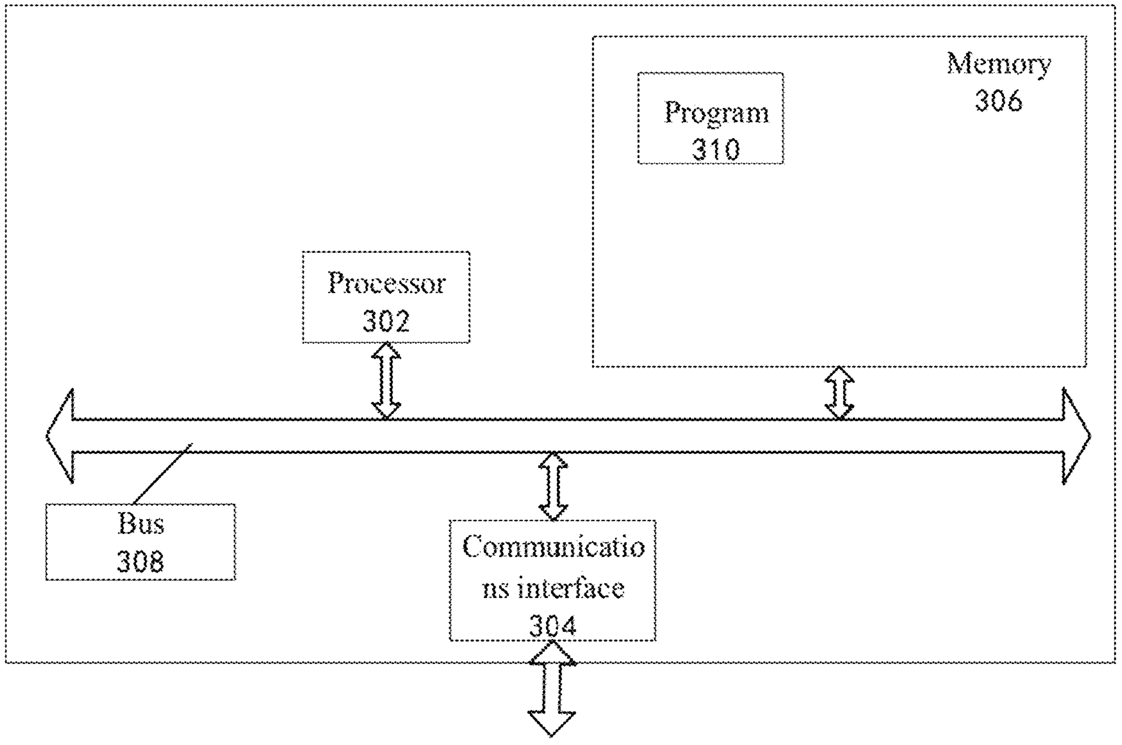
FIG. 5 shows a schematic structural diagram of a terminal according to an embodiment of the present disclosure.

FIG. 5 shows a schematic structural diagram of a terminal according to an embodiment of the present disclosure. The specific embodiments of the present disclosure do not limit the specific implementation of the terminal.

As shown in FIG. 5, the terminal may include: a processor 302, a communications interface 304, a memory 306 and a communication bus 308.

The processor 302, the communications interface 304 and the memory 306 communicate with each other through the communication bus 308.

The communications interface 304 is configured to communicate with network elements of other devices, such as clients or other servers.

The processor 302 is configured to execute the program 310, and may specifically execute steps of the data sharing method based on a blockchain according to any one of the above embodiments.

In particular, program 310 may include program code including computer operating instructions.

The processor 302 may be a central processing unit (CPU), or an application specific integrated circuit (ASIC), or one or more integrated circuits configured to implement embodiments of the present disclosure. The terminal includes one or more processors, which may be the same type of processor, such as one or more CPUs; or may be different types of processors such as one or more CPUs and one or more ASICs.

The memory 306 is configured to store the program 310. The memory 306 may may include a high-speed RAM memory, and may further include a non-volatile memory, and the like, such as at least one disk memory.

The program 310 may be specifically configured to cause the processor 302 to perform the following operations:

creating a multi-chain shared network structure matched with a target service scene, wherein the multi-chain shared network structure includes a service chain, a service system and a cross-chain router;

creating shared data and cross-chain link structure of original data after the service system collects the original data, and performing the data storage operation of the service chain on the shared data and cross-chain link structure through the cross-chain router; and when the service system sends a querying transaction of a target service chain through the cross-chain router, querying a target shared data and cross-chain link structure of the target service chain, and further querying the linked shared data and cross-chain link structure of the linked service chain based on the target shared data and cross-chain link structure.

Apparently, those skilled in the art should understand that the modules or steps in the present disclosure described above may be implemented by a general-purpose computing apparatus, which may be integrated on a single computing apparatus or distributed over a network including multiple computing apparatus. Alternatively, the modules or steps in the present disclosure may be implemented with program codes executable by a computing apparatus, such that the modules or steps in the present disclosure may be stored in a storage apparatus for execution by a computing apparatus, and in some cases the steps may be performed in a different order than that shown or described herein. Or the modules or steps in the present disclosure may be separately implemented by various integrated circuit modules, or multiple of the modules or steps are implemented in a single integrated circuit module. Thus, the present disclosure is not limited to any specific combination of hardware and software.

The above descriptions are only preferred examples of the present disclosure, and are not intended to limit the present disclosure. For those skilled in the art, the present disclosure may have various modifications and changes. Any modification, equivalent substitution and improvement made within the spirit and principle of the present disclosure are deemed to fall into the protection scope of claims of the present disclosure.

What is claimed is:

1. A data sharing method based on a blockchain, comprising:

creating a multi-chain shared network structure matched with a target service scene, wherein the multi-chain shared network structure comprises a service chain, a service system and a cross-chain router;

creating shared data and cross-chain link structure of original data after the service system collects the original data, and storing the shared data and cross-chain link structure on the service chain through the cross-chain router; and when the service system sends a querying transaction of a target service chain through the cross-chain router, querying a target shared data and cross-chain link structure of the target service chain, and further querying the linked shared data and cross-chain link structure of the linked service chain based on the target shared data and cross-chain link structure;

wherein the shared data and cross-chain link structure comprises a shared data item identifier, shared data item information fields, and cross-chain link fields of the shared data item, and wherein the creating shared data and cross-chain link structure of original data comprises:

constructing the shared data item identifier based on a chain identifier of the original data and a data item in-chain identifier, wherein the shared data item identifier is used for uniquely identifying the shared data item;

extracting a shared information field of the shared data item based on the target service scene, and constructing shared data item information fields based on the shared information field, wherein the shared data item information fields are used for describing the shared information of the target service scene; and determining a cross-chain relationship based on the shared data item information fields and constructing cross-chain link fields of the shared data item used both the cross-chain relationship and the linked shared data item identifier;

Wherein, when the shared data item information fields comprise data information of a data block or off-chain storage information of a data file/data block, configuring the cross-chain link fields of the shared data item as null link;

when the shared data item information fields comprise data hash value information of a data file/data block, configuring the cross-chain link fields of the shared data item as feature link;

when the shared data item information fields comprise service key shared information, configuring the cross-chain link fields of the shared data item as containing link; and when the shared data item information fields comprise service shared derivative information, configuring the cross-chain link fields of the shared data item as derivative link; and wherein the querying a target shared data and cross-chain link structure of the target service chain, and querying the linked shared data and cross-chain link structure of the linked service chain based on the target shared data and cross-chain link structure comprises:

querying the target shared data and cross-chain link structure of the target service chain based on a target shared data item identifier through the service system via the cross-chain router; and analyzing the cross-chain link fields of the target shared data and cross-chain link structure through the service system, and performing query operation on linked shared data based on the cross-chain link fields of the target shared data item to obtain the linked shared data and cross-chain link structure of the linked service chain;

wherein the performing query operation on linked shared data based on the cross-chain link fields of the target shared data item comprises:

when the cross-chain link field of the target shared data item is null link, ending the query operation on the linked shared data; and when the cross-chain link field of the target shared data item is any one of the following: the feature link, the containing link and the derivative link, querying the linked shared data and cross-chain link structure of the linked service chain linked with the cross-chain link field of the target shared data item through the service system via the cross-chain router.

2. The method according to claim 1, wherein the creating a multi-chain shared network structure matched with a target service scene comprises:

creating a service chain matched with the target service scene and a service system for data storage operation and query operation of the service chain based on an alliance chain technology; and establishing communication between the service chain and the cross-chain router based on a cross-chain technology, wherein different cross-chain routers are connected with each other, and the service system is communicated with the cross-chain router.

3. The method according to claim 1, wherein the storing the shared data and cross-chain link structure data on the service chain through the cross-chain router comprises:

initiating an initiation operation of a cross-chain transaction for storing the shared data on the service chains through the service system via the communication with the cross-chain router, and determining the service chains and the shared data and cross-chain link structures used for storing the shared data through the cross-chain router;

initiating a transaction operation of storing the shared data and cross-chain link structure on the service chain through the service system via the cross-chain router, and monitoring the shared data storage transaction state of the service chain;

when all transaction operations of storing the shared data and cross-chain link structure on the service chain are completed, initiating a submitting operation of the cross-chain transaction, and submitting the data changes of all shared data and cross-chain link structure to the corresponding service chains; and when not all transaction operations of storing the shared data and cross-chain link structure on the service chain are completed, initiating a rollback operation of the cross-chain transaction, and revoking the data changes of all shared data and cross-chain link structures from the corresponding service chains.

4. A non-transitory storage medium, wherein at least one executable instruction is stored in the non-transitory storage medium, and the executable instruction causes a processor to perform the method according to claim 1.

5. A terminal, comprising: a processor, a memory, a communications interface and a communication bus through which the processor, the memory and the communications interface communicating with each other, wherein the memory is configured to store at least one executable instruction, and the executable instruction causes the processor to perform the method according to claim 1.

6. A data sharing apparatus based on a blockchain, comprising:

one or more processors; and a memory coupled to the one or more processors, storing computer-executable instructions;

wherein the instructions, when executed by the one or more processors, cause the apparatus to perform the following operations:

creating a multi-chain shared network structure matched with a target service scene, wherein the multi-chain shared network structure comprises a service chain, a service system and a cross-chain router;

creating shared data and cross-chain link structure of original data after the service system collects the original data, and storing the shared data and cross-chain link structure on the service chain through the cross-chain router; and when the service system sends a query transaction of a target service chain through the cross-chain router, querying a target shared data and cross-chain link structure of the target service chain, and further querying the linked shared data and cross-chain link structure of the linked service chain based on the target shared data and cross-chain link structure;

wherein the shared data and cross-chain link structure comprises a shared data item identifier, shared data item information fields, and cross-chain link fields of the shared data item, and wherein the creating shared data and cross-chain link structure of original data comprises:

constructing the shared data item identifier based on a chain identifier of the original data and a data item in-chain identifier, wherein the shared data item identifier is used for uniquely identifying the shared data item;

extracting a shared information field of the shared data item based on the target service scene, and constructing shared data item information fields based on the shared information field, wherein the shared data item information fields are used for describing the shared information of the target service scene; and determining a cross-chain relationship based on the shared data item information fields and constructing cross-chain link fields of the shared data item used both the cross-chain relationship and the linked shared data item identifier;

wherein, when the shared data item information fields comprise data information of a data block or off-chain storage information of a data file/data block, configuring the cross-chain link fields of the shared data item as null link;

when the shared data item information fields comprise data hash value information of a data file/data block, configuring the cross-chain link fields of the shared data item as feature link;

when the shared data item information fields comprise service key shared information, configuring the cross-chain link fields of the shared data item as containing link; and when the shared data item information fields comprise service shared derivative information, configuring the cross-chain link fields of the shared data item as derivative link; and wherein the querying a target shared data and cross-chain link structure of the target service chain, and querying the linked shared data and cross-chain link structure of the linked service chain based on the target shared data and cross-chain link structure comprises:

querying the target shared data and cross-chain link structure of the target service chain based on a target shared data item identifier through the service system via the cross-chain router; and analyzing the cross-chain link fields of the target shared data and cross-chain link structure through the service system, and performing query operation on linked shared data based on the cross-chain link fields of the target shared data item to obtain the linked shared data and cross-chain link structure of the linked service chain;

wherein the performing query operation on linked shared data based on the cross-chain link fields of the target shared data item comprises:

when the cross-chain link field of the target shared data item is null link, ending the query operation on the linked shared data; and when the cross-chain link field of the target shared data item is any one of the following: the feature link, the containing link and the derivative link, querying the linked shared data and cross-chain link structure of the linked service chain linked with the cross-chain link field of the target shared data item through the service system via the cross-chain router.

* * * * *